March 19, 1963    D. SKRUPKY    3,081,646
TRANSMISSION GEARING
Filed Aug. 24, 1960    3 Sheets-Sheet 1

INVENTOR
DAN SKRUPKY

BY
ATTORNEY

March 19, 1963 D. SKRUPKY 3,081,646
TRANSMISSION GEARING
Filed Aug. 24, 1960 3 Sheets-Sheet 2

INVENTOR
DAN SKRUPKY

BY *Arnold J. Ericsen*

ATTORNEY

March 19, 1963    D. SKRUPKY    3,081,646
TRANSMISSION GEARING
Filed Aug. 24, 1960    3 Sheets-Sheet 3

INVENTOR
DAN SKRUPKY

BY

ATTORNEY

3,081,646
TRANSMISSION GEARING
Dan Skrupky, Crandon, Wis.
Filed Aug. 24, 1960, Ser. No. 51,611
4 Claims. (Cl. 74—665)

The present invention relates to transmission gearing and more particularly to a type of transmission adapted for operating connection with a power output unit and which comprises a power input shaft, an intermediate shaft and a pair of output shafts, gearing on said shafts arranged for intermeshing relationship for driving said output shafts and wherein the respective output shafts are transversely arranged for simultaneously driving a plurality of power driven assemblies and wherein the intermediate shaft includes a plurality of axially shiftable gears rotatable therewith and arranged for variations in power transmission upon meshing engagement with respective driven gears on at least one of said pairs of output shafts.

The transmission of the present invention has particular adaptability for use in portable core drill operations. Core drilling is presently accomplished by using an independent core drill assembly which is powered either by a power unit attached to the drill unit or by connecting the drill unit to a separate power unit by belt or gears. In the past, power to the drill rod hoist unit and to the water pump unit was furnished independently of the drill unit. With the present transmission, when attached to a crawler type tractor, a complete drilling operation may be performed without the need of connecting the various units independently to power sources. When the transmission of this invention is attached to the power source, the core drilling unit, the water pump unit, and the drill rod hoist unit can be attached to the transmission. The entire transmission and component units as attached to the power source, can be transported to the drill site, and if necessary, when attached to a crawler type tractor, said tractor can doze its own road to gain access to a remote site. Upon arrival at the site, drilling can be commenced at once and can be accomplished at any one of three desired drill speeds, with the dozer blade, loaded when necessary, acting as a counterweight to the weight of the drilling apparatus. The drill speed may be varied at any time in the drilling operation when necessitated by the terrain encountered, and without the necessity of additional clutching mechanisms when shifting is carried out in the sequence hereinafter described.

An object of the invention is to provide a drill transmission which can simultaneously deliver power to a core drilling unit and a water pump unit, and in addition, deliver power to a drill rod hoist unit as required.

Another object of this invention is to provide a drill transmission having a plurality of drill speeds which may be varied depending upon the character of the material through which the drill is operating.

Still another object of this invention is to provide a portable drill transmission adapted for attachment to the power take-off unit of a crawler tractor thereby providing an efficient means for drilling on remote sites.

A further object of this invention is to provide a drill transmission with a plurality of power output shafts, one of said shafts being transverse to, and driven by, another of said shafts; thereby providing for simultaneous use of all power output shafts without spatial interference between the respective power driven units.

Figure 1:
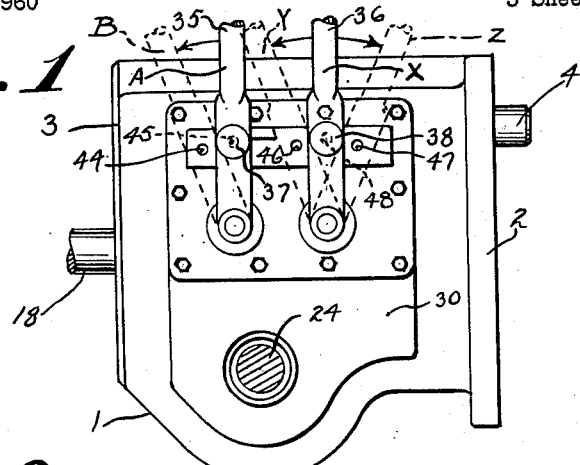
FIG. 1 is an elevation view of the drill transmission and further illustrating the shifting lever operating positions.
Figure 2:
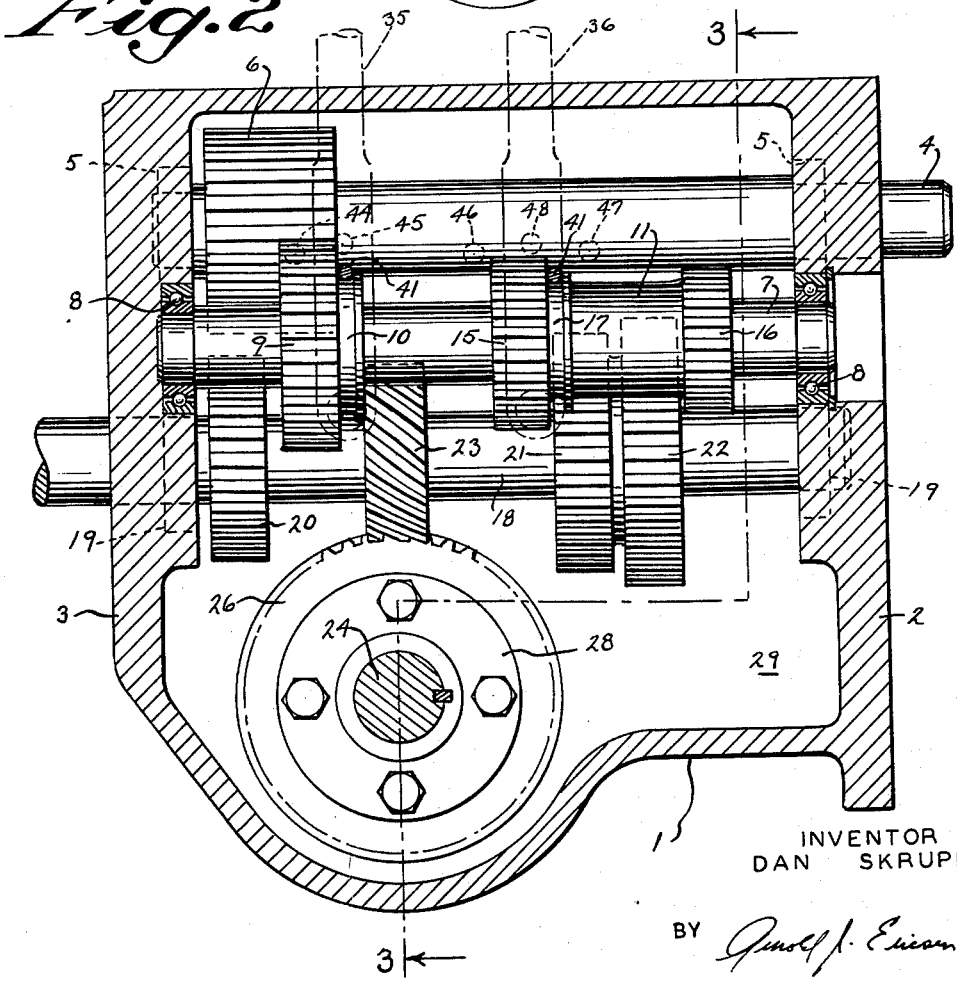
FIG. 2 is a vertical sectional view with the housing being cut open to show the mesh point of certain gears contained therein.

Referring to FIG. 2, the transmission housing 1 of any desired form comprises opposed side walls 2 and 3, the external surfaces of which are preferably machined for respective attachment to a power take-off unit and a core drill assembly (not shown). A drive shaft 4 driven from any desired source is journalled in the housing 1 being slidably received in an opening of the side wall 2 and having its inner end terminating within a re-entrant bore of the side wall 3 and rotatably supported by bearings 5. Affixed to the drive shaft 4 is a driving spur gear 6, which is rotatable therewith.

Also journalled in bores of the opposed side walls 2 and 3 of the housing 1 is an idler shaft 7 provided at its respective ends with bearings 8. The idler shaft 7 is provided with an idler shaft gear 9 whose teeth are adapted to mesh with the driving spur gear 6. The idler shaft gear 9 is rotatable with, and axially slidable on, the idler shaft 7. The shaft 7 and gear 9 may be keyed to one another in conventional manner (not shown). Adjacent to the idler shaft gear 9 is an integral flanged annular ring 10 adapted for axially shifting the idler shaft gear 9 in a manner which will hereinafter be described. The idler shaft 7 is also provided with a hollow quill shaft 11. The quill shaft 11 may be keyed to the idler shaft 7 by means of the double keyway 12 shown in FIG. 3 or by means of other spline type attachment. The quill shaft 11 has securely attached to it, at its respective ends, a first quill shaft gear 15 and a second quill shaft gear 16. Also attached to the quill shaft 11 is a second flanged annular ring 17 which may be positioned adjacent to and integral with the first quill shaft gear 15, and adapted for axially shifting the quill shaft 11 in a manner which will hereinafter be described.

A parallel driven shaft 18 is journalled in the housing 1 being slidably received in an opening of the side wall 3 and having its inner end terminating in a re-entrant bore of the side wall 2, and rotatably supported by bearing 19. The parallel driven shaft 18 is provided with a first driven gear 20, a second driven gear 21, a third driven gear 22 and a helical gear 23; all of said gears 20, 21, 22 and 23 being affixed to and rotatable with the parallel driven shaft 18. The first driven gear 20 is adapted to mesh with the teeth of the idler gear 9. The second driven gear 21 is adapted to mesh with the teeth of the first quill shaft gear 15 and the third driven gear 22 is adapted to mesh with the teeth of the second quill shaft gear 16.

Figure 3:
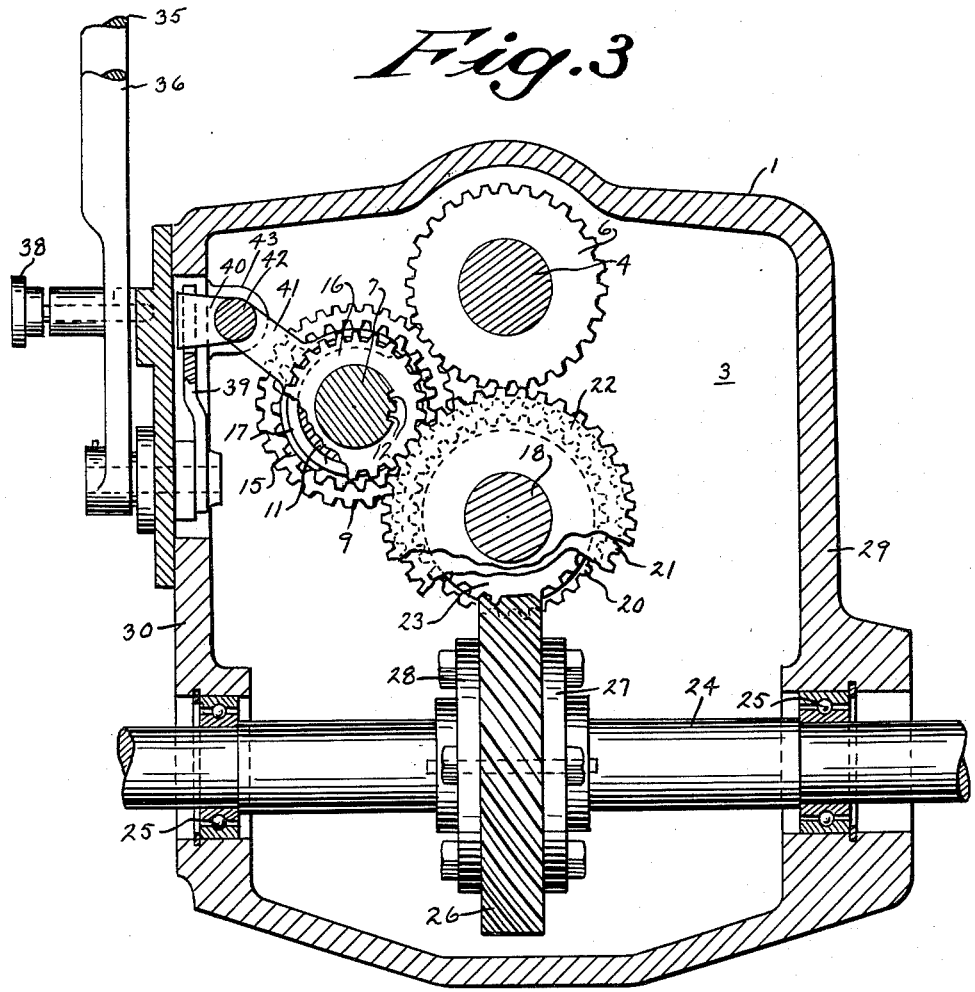
FIG. 3 is a vertical sectional view taken approximately on the line 3—3 of FIG. 2.

As shown in FIG. 3, a transverse driven shaft 24 is journalled in the housing 1, being slidably received in respective openings of the side walls 29 and 30 of the housing, and rotatably supported by bearings 25. The shaft 24 has its axis substantially perpendicular, but not intersecting, the axis of the parallel driven shaft 18. The shaft 24 is provided with a helical gear 26 which is held in proper relative position on said shaft by a pair of collars 27 and 28, and which helical gear 26 is rotatable with the transverse driven shaft 24 and adapted to mesh with the helical gear 23 of the parallel driven shaft 18.

A pair of shifting lever assemblies 35 and 36 are mounted on the side wall 30 of the housing 1 and are adapted to being held in desired operating position by means of a pair of lock pins 37 and 38 biased inwardly by a spring (not shown). Each shifting lever assembly includes a slotted fork 39 which is adapted for engagement with extension 40 of each of the two shifting fork assemblies 41 of the lever assemblies 35 and 36, respectively. Each shifting fork assembly includes a shaft 42 which is journalled into the openings in a pair of end brackets, of which 43 is typical. The shifting fork assemblies 41 are adapted for engagement with the respective flanged annular rings 10 and 17 for operation by lever assemblies 35 and 36, respectively.

Where the shafts 4, 18 and 24 extend through the housing 1, suitable oil seals (not shown) are provided so that the housing forms an oil reservoir for the gears mounted therein.

Figure 4:
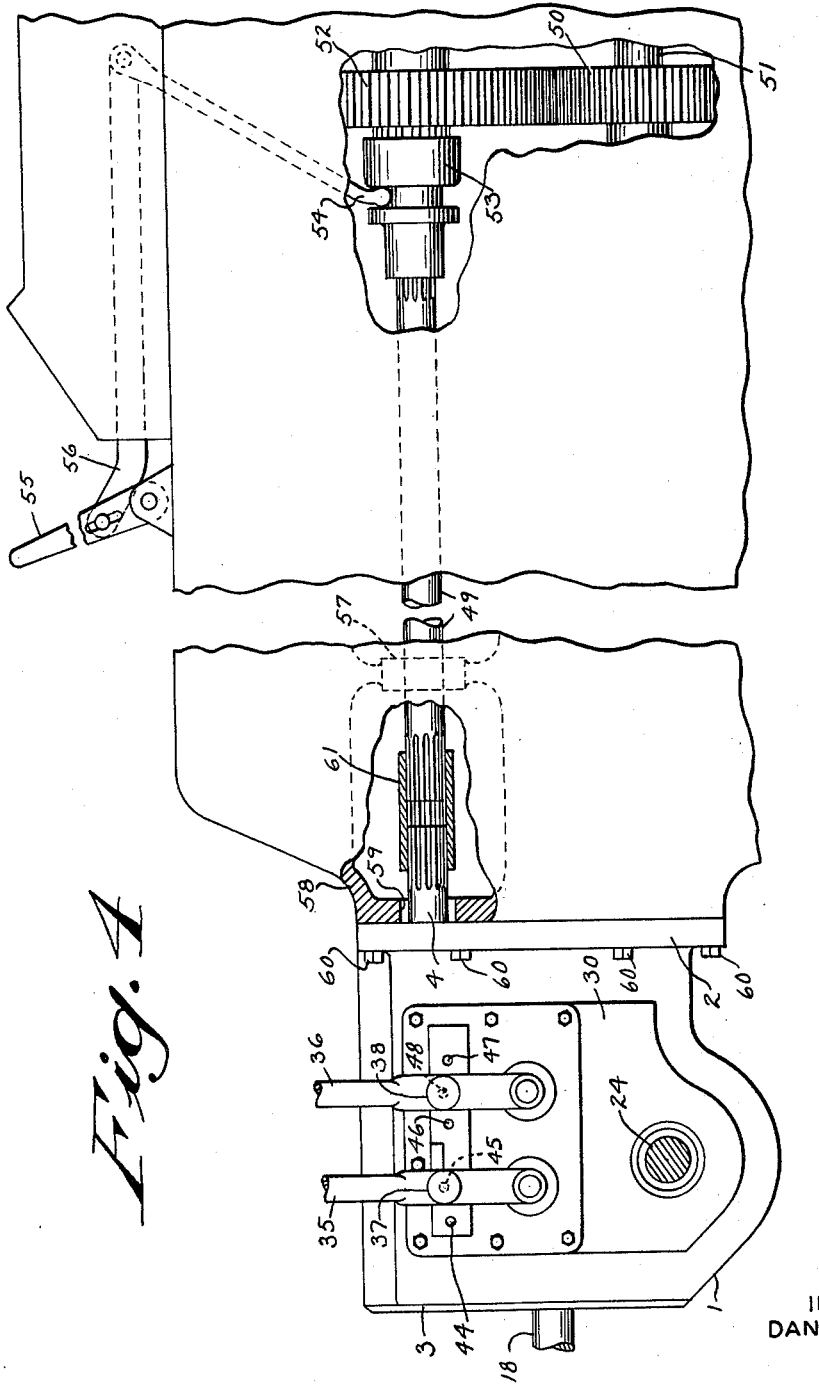
FIG. 4 is a view in elevation of the drill transmission connected to a power take-off unit of a tractor.

The illustrated embodiment of the drill transmission is adapted for attachment to a power take-off unit of a crawler tractor. In FIG. 4 one type of a common power take-off unit is illustrated. The power take-off unit of FIG. 4 is of the indirect drive type in which a power take-off shaft 49 is driven from the transmission of the tractor. A transmission gear 50 is mounted on a shaft 51 of the transmission and the gear 50 meshes with a power take-off shaft gear 52 which floats except when engaged by a shiftable coupling 53. The coupling 53 is shifted into and out of engagement with the gear 52 by a shifting fork 54 which is actuated by a shift lever 55 through a rod 56 which is guided for longitudinal movement upon rotation of the shift lever 55. The power take-off shaft 49 is journaled through a support bearing 57 at the rear end of the tractor and a splined end of the power take-off shaft 49 extends into a housing 58. The housing 57 is provided with an opening 59 to receive the input shaft of the equipment to be driven.

The operation of the drill transmission is as follows:

Face 2 of housing 1 is attached to the corresponding face of the housing 58 by studs 60 and the shaft 4, which is splined at its end, extends through the opening 59 and is operatively connected to the shaft 49 by a splined coupling 61. A core drill unit (not shown) is attached to face 3 of the housing 1 and parallel shaft 18 is adapted to be engaged with the coupling of the core drill unit. A pulley to drive a drill hoist assembly (not shown) may be attached to one end of transverse shaft 24 and a second pulley may be attached to the opposite end of shaft 24 to drive a water pump (not shown).

By releasing lock pin 37 and positioning shifting lever assembly 35 in a cooperating locking indent 44 to move it from neutral position A to position B, while leaving shifting lever 36 in a neutral position X, with lock pin 38 being retained in cooperating indent 48, the slotted fork 39 will be moved, thereby sliding the shifting fork assembly 41 in the direction of side wall 3. By engagement with the flanged annular ring 10 of gear 9, the shifting fork assembly 41 slides the idler shaft gear 9 axially to mesh with the first driven gear 20 of the parallel shaft 18. It will be seen that as shaft 4 rotates, such rotation is transmitted from driving gear 6 to the idler shaft gear 9, thereby rotating the idler shaft 7 in an opposite direction. In the preferred embodiment, the ratio between idler shaft gear 9 and driving gear 6 is chosen to be 1:1, as the idler shaft is being used merely to reverse rotational direction. This rotation is then transmitted from the idler shaft gear 9 to the first driven gear 20 causing the parallel driven shaft 18 to rotate in the same direction as the driver shaft 4 for any desired function, such as drilling at a desired speed. In addition, the present invention also provides a means of concurrently supplying power to a drill hoist and/or a water pump, through the media of the transverse shaft 24. Transmitting the rotation through the helical gear 23 to the helical gear 26 of the transverse shaft 24 will cause the transverse driven shaft 24 to rotate at a speed dependent upon the ratio between gears 23 and 26.

When it is desired to reduce the output speed of the respective driven shafts 18 and 24, shifting lever 35 is placed in its neutral position A and is held in the position A by lock pin 37 resting in cooperating locking indent 45. Lock pin 38 is then released and shifting lever assembly 36 is positioned in a cooperating locking indent 46 to move it from neutral position X to position Y. Movement of the respective shifting fork assembly 41 causes the hollow quill shaft 11, with its attached quill shaft gears 15 and 16, to be shifted in opposite axial directions. Thus, movement of the assembly 36 to its Y position disposes the quill shaft gear 15 to mesh with the second driven gear 21. The rotation is then transmitted from the drive shaft 4 to the idler shaft 7 by means of the driving gear 6 which always is in mesh with the axially movable idler shaft gear 9, thereby causing the idler shaft 7 to rotate in an opposite direction from that of the drive shaft 4. Since the first quill shaft gear 15 has been caused to mesh with the second driven gear 21, the parallel driven shaft 18 will rotate in the same direction as the drive shaft 4 and at a speed dependent upon the ratio between the first quill shaft gear 15 and the second driven gear 21, which, in the preferred embodiment, is chosen as 1:1.4. This rotation will also provide power from the helical gear 23 to the helical gear 26 to cause the transverse driven shaft 24 to rotate.

When it is desired to reduce the output speed of the respective driven shafts 18 and 24 still further, shifting lever 35 is permitted to remain in its neutral position A and lock pin 38 is released to permit the shifting lever assembly 36 to be positioned in a cooperating locking indent 47 to move it to operating position. The respective shifting fork assembly 41 causes the hollow quill shaft 11, with its attached quill shaft gears 15 and 16, to be shifted axially in the direction of side wall 3 (see FIG. 2), so that quill shaft gear 16 meshes with the third driven gear 22. As the drive shaft 4 rotates, the rotation is transmitted from the driving gear 6 to the idler shaft gear 9 to thereby cause the idler shaft 7 to rotate in an opposite direction from the drive shaft 4. This rotation is transmitted from the quill shaft gear 16 to the third driving gear 22, causing the parallel driven shaft 18 to rotate in the same direction as the drive shaft 4, and at a speed dependent upon the ratio between the second quill shaft gear 16 and the third driven gear 22, which in the preferred embodiment is chosen as 1:1.82. The transverse driven shaft 24 is also caused to rotate, since the rotation is transmitted from the helical gear 23 to the helical gear 26 and thence to the transverse driven shaft 24.

It will be noted that the invention does not require clutching means for its operation when such operation is carried out in the above described sequence. When, however, it is desired as a safety device, an external clutching means may be used in conjunction with the transmission.

While the principal utility of the invention resides in the transmission of power to a drill unit, a hoist unit and a water pump unit from a single source of power, nevertheless it will be understood that the invention is not necessarily limited thereto, as the present mechanism may be employed to transmit power to different types of power driven devices.

I claim:

1. A drill transmission comprised of a power input shaft adapted for operating connection with a power output source, an idler shaft, first and second power output shafts in relative transverse position, a driving gear affixed to said input shaft, a plurality of driven gears affixed to said first output shaft, a plurality of axially shiftable gears rotatably attached to said idler shaft and adapted for providing variation in power transmission upon meshing engagement with said driven gears of said first output shaft, one of said axially shiftable gears being in constant meshing engagement with said driving gear, and gearing on said first and second output shafts in meshing engagement.

2. A drill transmission comprised of a transmission housing; a drive shaft adapted to be operatively connected to a power take-off unit and rotatable in response thereto, and having a driving spur gear attached thereto and rotatable therewith; a splined idler shaft substantially parallel to said drive shaft, said idler shaft having an idler shaft gear rotatable therewith and in mesh with said driving spur gear, said idler shaft gear being axially slidable on said idler shaft between an engaging position and a neutral position and while in mesh with said driving spur gear, said idler shaft gear having an integral flanged annular ring defining a peripheral groove, said idler shaft also having a hollow quill shaft rotatable therewith, said quill shaft being axially slidable on said idler shaft between a neutral position, a first engaging position and a second engaging position, said quill shaft having first and second quill shaft gears spaced from each other and secured thereto, said quill shaft having an integral flanged annular ring defining a peripheral groove; a first power output shaft substantially parallel to said drive shaft and said idler shaft, said first output shaft having a first driven gear rotatable therewith and adapted for meshing engagement with said idler shaft gear when said idler shaft gear is in said engaging position, said first output shaft also including a second and a third driven gear rotatable therewith and axially spaced thereon, said second driven gear being adapted for meshing engagement with said first quill shaft gear when said quill shaft is in said first engaging position, and said third driven gear being adapted for meshing engagement with said second quill shaft gear when said quill shaft is in said second engaging position; a pair of shifting levers, the first shifting lever being adapted to axially shift said idler shaft gear between said engaging position and said neutral position, the second shifting lever being adapted to axially shift said quill shaft between said neutral position, said first engaging position and said second engaging position; a second power output shaft disposed transversely relative to said first output shaft; and gearing on said first and second output shafts in meshing engagement.

3. A drill transmission comprised of a transmission housing; a drive shaft adapted to be operatively connected to a power output source and rotatable in response thereto, and having a driving spur gear attached thereto and rotatable therewith; a splined idler shaft substantially parallel to said drive shaft, said idler shaft having an idler shaft gear rotatable therewith and in mesh with said driving spur gear, said idler shaft gear being axially slidable on said idler shaft between an engaging position and a neutral position and while in mesh with said driving gear, said idler shaft also having a hollow quill shaft rotatable therewith, said quill shaft being axially slidable on said idler shaft between a neutral position, a first engaging position and a second engaging position, said quill shaft having first and second quill shaft gears spaced from each other and secured thereto; a first power output shaft substantially parallel to said drive shaft and said idler shaft, said first output shaft having a first driven gear rotatable therewith and adapted for meshing engagement with said idler shaft gear when said idler shaft gear is in said engaging position, said first output shaft also including a second and a third driven gear rotatable therewith and axially spaced thereon, said second driven gear being adapted for meshing engagement with said first quill shaft gear when said quill shaft is in said first engaging position, and said third driven gear being adapted for meshing engagement with said second quill shaft gear when said quill shaft is in said second engaging position, a fourth driven gear secured to said first output shaft and rotatable therewith; a second power output shaft disposed transversely relative to said first output shaft, said second output shaft having a gear which is in meshing engagement with said fourth driven gear of said first output shaft; and shifting lever assemblies adapted to independently shift the axial position of said idler shaft gear and the axial position of said quill shaft.

4. In combination with a power take-off unit, a drill transmission comprised of a transmission housing; a drive shaft operatively connected to said power take-off unit and rotatable in response thereto, and having a driving spur gear attached thereto and rotatable therewith; a splined idler shaft substantially parallel to said drive shaft, said idler shaft having an idler shaft gear rotatable therewith and in mesh with said driving spur gear, said idler shaft gear being axially slidable on said idler shaft between an engaging position and a neutral position and while in mesh with said driving spur gear, said idler shaft gear having an integral flanged annular ring defining a peripheral groove, said idler shaft also having a hollow quill shaft rotatable therewith, said quill shaft being axially slidable on said idler shaft between a neutral position, a first engaging position and a second engaging position, said quill shaft having first and second quill shaft gears spaced from each other and secured thereto, said quill shaft having an integral flanged annular ring defining a peripheral groove; a first power output shaft substantially parallel to said drive shaft and said idler shaft, said first output shaft having a first driven gear rotatable therewith and adapted for meshing engagement with said idler shaft gear when said idler shaft gear is in said engaging position, said first output shaft also including a second and a third driven gear rotatable therewith and axially spaced thereon, said second driven gear being adapted for meshing engagement with said first quill shaft gear when said quill shaft is in said first engaging position, and said third driven gear being adapted for meshing engagement with said second quill shaft gear when said quill shaft is in said second engaging position, a fourth driven gear secured to said first output shaft and rotatable therewith; a second power output shaft disposed transversely relative to said first output shaft, said second output shaft having a gear which is in meshing engagement with said fourth driven gear of said first output shaft; and a pair of shifting levers, the first shifting lever being adapted to axially shift said idler shaft gear between said engaging position and said neutral position, the second shifting lever being adapted to axially shift said quill shaft between said neutral position, said first engaging position and said second engaging position.

References Cited in the file of this patent

UNITED STATES PATENTS

| | | |
|---|---|---|
| 1,861,480 | Orr | June 7, 1932 |
| 2,940,321 | Ruoff et al. | June 14, 1960 |